United States Patent [19]
Aebi

[11] Patent Number: 5,237,911
[45] Date of Patent: Aug. 24, 1993

[54] COFFEE BREWING MACHINE
[75] Inventor: Thomas Aebi, Saland, Switzerland
[73] Assignee: CIS Elektrogerate AG, Hinwil, Switzerland
[21] Appl. No.: 967,448
[22] Filed: Oct. 28, 1992
[30] Foreign Application Priority Data
  Dec. 3, 1991 [DE] Fed. Rep. of Germany ....... 4139804
[51] Int. Cl.⁵ .............................................. A47J 31/00
[52] U.S. Cl. ................................... 99/287; 99/289 R; 99/297
[58] Field of Search ............. 99/289 R, 289 D, 289 P, 99/280, 281, 282, 283, 287, 295, 297, 299, 300, 304, 305, 302 P; 318/282, 285, 286

[56] References Cited
U.S. PATENT DOCUMENTS

| | | | |
|---|---|---|---|
| 4,203,054 | 5/1980 | Totsu | 318/285 |
| 4,797,296 | 1/1989 | Meier et al. | 99/289 R |
| 4,858,522 | 8/1989 | Castelli | 99/289 R |
| 4,934,258 | 6/1990 | Versini | 99/289 R |
| 4,970,948 | 11/1990 | Giannelli | 99/289 R |
| 5,134,925 | 8/1992 | Bunn et al. | 99/289 R |

Primary Examiner—Harvey C. Hornsby
Assistant Examiner—Reginald L. Alexander
Attorney, Agent, or Firm—Tarolli, Sundheim & Govell

[57] ABSTRACT

The invention provides a coffee brewing machine, comprising a container for fresh cold water, a boiler for heating the fresh cold water, a brewing chamber adapted to receive coffee powder, a pump for feeding the fresh cold water from the container to the boiler and therefrom into the brewing chamber, a piston fitting into the brewing chamber and being movably mounted such that it can be moved into the brewing chamber to compress the coffee powder contained in the brewing chamber and removed from the brewing chamber, and an electric DC motor for driving the piston into the brewing chamber and for retracting it out of the brewing chamber. In order to provide for a simple connection of the electric motor to the mains voltage, a drop resistor and a rectifier diode are connected in series with the electric motor. The drop resistor simultaneously serves as a heating element for a hotplate on which the coffee cups can be preheated.

9 Claims, 2 Drawing Sheets

COFFEE BREWING MACHINE

BACKGROUND OF THE INVENTION

1. Field of the Invention

The present invention refers to a coffee brewing machine, particularly an espresso coffee brewing machine, comprising a container for fresh cold water, a boiler for heating the fresh cold water, a brewing chamber adapted to receive coffee powder, a pump for feeding the fresh cold water from the container to the boiler and therefrom into the brewing chamber, a piston fitting into the brewing chamber and being movably mounted such that it can be moved into the brewing chamber to compress the coffee powder contained in the brewing chamber and removed from the brewing chamber, and drive means for driving the piston into the brewing chamber and for retracting it out of the brewing chamber.

2. Prior Art

Such coffee brewing machines are well known in the art for a long time and are used, even if they are called "espresso machine", both for brewing espresso coffee as well as normal coffee. Automatically operating coffee machines of this kind usually comprise an electric motor for driving a piston into a brewing chamber containing coffee powder and for retracting the piston out of the brewing chamber when the coffee has been brewed. Once the coffee powder contained in the brewing chamber is compressed, pressurized hot water is fed into the brewing chamber; the hot water penetrates the compressed coffee powder and escapes from the brewing chamber as coffee.

As the piston has to be displaced in two opposite directions, on the one hand toward the brewing chamber and into its interior for compressing the coffee powder, and on the other hand in the opposite direction, out of the interior of the brewing chamber to enable the used coffee powder to be removed from the brewing and to enable fresh coffee powder to be filled into the brewing chamber, a complicated and expensive linkage construction between electric motor and piston had to be used. Such linkage construction is required to transform the rotational motion of the electric motor into a linear displacement of the piston in two opposite directions, since the electric motors used up to now are electric AC motors.

The aforementioned linkage construction for transforming the rotational motion in a linear motion has three basic disadvantages:

1. It is expensive and increases the price of the coffee machine.
2. It is liable to give trouble and it is subjected to wear, with the result that the expenditure of servicing is quite high.
3. The weight of the coffee machine is increased.

For these reasons, at first sight, it could have been obvious to use an electric DC motor for the displacement of the piston because a DC motor can be operated in two opposite senses of rotation without problems However, the provision of an electric DC motor involves other disadvantages:

1. In order to operate an electric DC motor, a DC power supply must be provided
2. Electric DC motors which come into consideration as far as the price is concerned usually have an operating voltage of less than 80 volts, often 48 volts. Thus, the mains voltage of 220 or 110 volts must be transformed down to the operating voltage of the DC motor and, further, must be rectified. The provision of a suitable transformer, however, would ruin the advantages in price and weight gained by the use of an electric DC motor.

A further disadvantage with known espresso coffee machines is that the coffee often is quite cold when it has been prepared, particularly if an espresso coffee is prepared (small amount of hot water) and if the coffee cups are not preheated.

OBJECTS OF THE INVENTION

It is an object of the invention to improve a known coffee brewing machine of the kind mentioned hereinbefore such that an electric DC motor can be used for driving the piston for the compression of the coffee powder in the brewing chamber without involving the disadvantages discussed above.

It is a further object of the invention to improve a known coffee brewing machine of the kind mentioned hereinbefore such that the electric motor can be driven in two opposite senses of rotation and which can be connected to the mains power supply without the need of heavy and complicated additional circuit components.

It is a still further object of the invention to improve a known coffee brewing machine of the kind mentioned hereinbefore such that, additionally and with a low expenditure, a heating device can be provided for preheating the coffee cups, with the result that even small espresso coffees remain sufficiently hot when they are ready to drink.

SUMMARY OF THE INVENTION

To meet these and other objects, the invention provides a coffee brewing machine, particularly an espresso coffee brewing machine, comprising a container for fresh cold water, a boiler for heating the fresh cold water, a brewing chamber adapted to receive coffee powder, a pump for feeding the fresh cold water from the container to the boiler and therefrom into the brewing chamber, a piston fitting into the brewing chamber and being movably mounted such that it can be moved into the brewing chamber to compress the coffee powder contained in the brewing chamber and removed from the brewing chamber, and drive means for driving the piston into the brewing chamber and for retracting it out of the brewing chamber.

The drive means include an electric DC motor having a nominal operating voltage lower than the mains voltage, an electric resistor connected in series with the electric DC motor for the adaptation of the higher mains voltage to the operating voltage of the electric DC motor, a first rectifier which can be connected in series with the electric resistor and the electric DC motor for operating the motor in a first sense of rotation, and a second rectifier which can be connected in series with the electric resistor and the electric DC motor for operating the motor in a second, opposite sense of rotation. Further, there is provided a hotplate for heating cups and for keeping the brewed coffee warm whereby the electric resistor connected in series with the electric DC motor serves as a heating element for the hotplate.

In order to enable the electric motor to be connected to the mains voltage (220 or 110 volts) without the need to provide a costly electric circuit, there is just provided a drop resistor and a diode, both connected in series with the electric DC motor. Preferably, this drop resistor is effective both as drop resistor for the electric motor and as heating element for the hotplate during the operation of the electric DC motor.

Coffee brewing machines of this kind usually comprise a control unit with an integrated microprocessor. Thus, it is possible, without significant additional expenditure, to energize the drop resistor via the control unit such that the drop resistor isolatedly serves as a heating element for the hot plate even if the electric DC motor is not in operation, and it is easily possible to control the power fed to the resistor and, thereby, the heating power of the hotplate.

Due to the fact that the drop resistor used to decrease the voltage fed to the electric DC motor simultaneously is used as a heating element for the hotplate, the heat dissipation of the drop resistor, which is generated anyway, can be meaningfully used and there is no need to provide a heat sink for this resistor which otherwise would be required.

BRIEF DESCRIPTION OF THE DRAWINGS

In the following, an embodiment of the coffee brewing machine according to the invention will be further described, with reference to the accompanying drawings, in which.

DETAILED DESCRIPTION OF A PREFERRED EMBODIMENT

Figure 1:
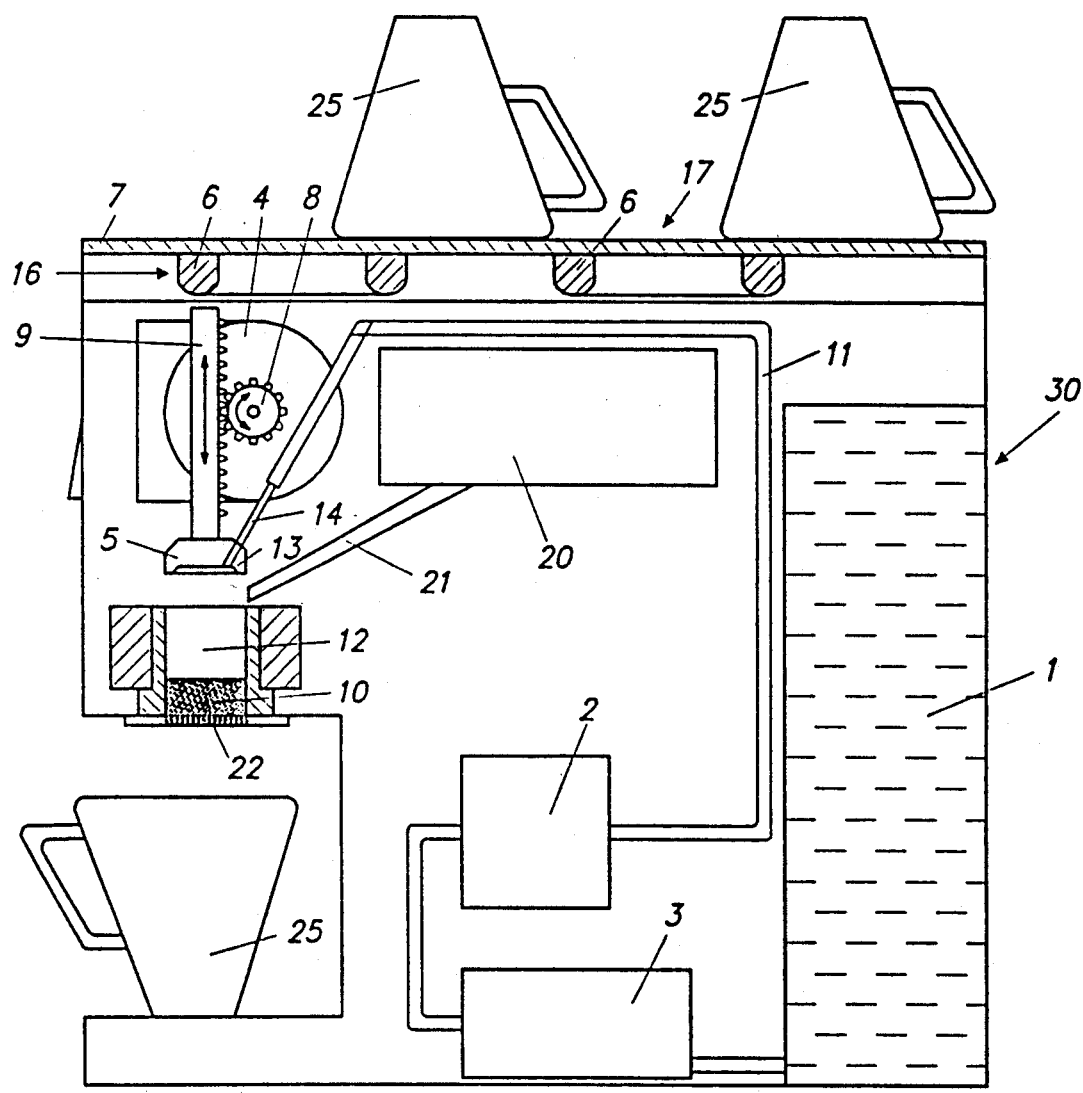
FIG. 1 shows a schematic longitudinal sectional view of an espresso coffee machine to show the general design of the machine of the invention.

The coffee brewing machine schematically shown in FIG. 1 in a longitudinal sectional view comprises a housing 30 in which there are arranged a container 1 for fresh cold water, a boiler 2 which is constituted, in the present example, as a constant flow water heater, as well as a pump 3 for feeding fresh cold water from the container 1 to the boiler 2. Further, there is provided a brewing chamber 12 receiving coffee powder 10. The ground coffee powder 10 is dosed into the brewing chamber 12 from a coffee powder stock container 20 through a feeding tube 21.

A rack-like piston rod 9 is mounted above the brewing chamber 12 and comprises at its end next to the brewing chamber 12 a piston 5. Since the piston rod 9 is mounted to be driven to an up-and-down movement, the coffee powder 10 in the brewing chamber 12 can be compressed by the piston 5 upon displacing the piston rod 9 downward. For the operation of the piston rod 9, i.e. for moving the piston 5 down into the interior of the brewing chamber 12 and for retracting it out of the brewing chamber 12, there is provided a driving motor 4, constituted by a low-voltage electric DC motor. The nominal operating voltage of the electric DC motor 4 is much less than the mains voltage, e.g. 48 volts. Such motors are easily available and inexpensive. The electric DC motor 4 is connected in series with a drop resistor 6 which, on the one hand, lowers the high mains voltage to the operating voltage of the motor 4 and, on the other hand, serves simultaneously as a heating element 16 for a hotplate 7.

The electric DC motor 4 is provided with a pinion 8 meshing with the rack-like piston rod 9. Thus, upon rotating the pinion 8 in a first sense of rotation, the piston rod 9 and, therewith, the piston 5 is moved downward into the interior of the brewing chamber, thereby compressing the coffee powder 10 contained therein, and upon rotating the pinion 8 in a second, opposite sense of rotation, the piston rod 9 and, therewith, the piston 5 is moved upwards out of the brewing chamber 12, thereby releasing the upper open end thereof.

In order to prepare a cup of coffee, a predetermined amount of coffee powder 10 is filled into the brewing chamber and the electric DC motor 4 is operated in said first sense of rotation, whereby the piston 5 is lowered into the interior of the brewing chamber 12 to such an extent that the coffee powder 10 contained in the brewing chamber 12 is compressed to a predetermined value. As soon as the piston 5 rests on the upper surface of the coffee powder 10 with a predetermined force, the real brewing operation starts. For this purpose, the heated and pressurized water 11 is fed via a hot water supply pipe 14 through the piston 5. The piston 5 is provided, at its lower surface, with a screen filter 13 such that the hot water 11 can pass through the piston 5 and thereafter flow through the compressed coffee powder 10. The thus prepared coffee escapes from the brewing chamber through a further screen filter 22 provided at the lower surface of the brewing chamber 12 and is collected in a coffee cup 25 placed below the brewing chamber 12.

After the brewing operation, the electric DC motor 4 is operated again, but in opposite sense of rotation, with the result, that the piston 5 is moved upwards to release the open top of the brewing chamber 12. Then, the used coffee powder 10 can be removed from the brewing chamber 12 in a manner known in the art which must not be explained further.

Figure 2:
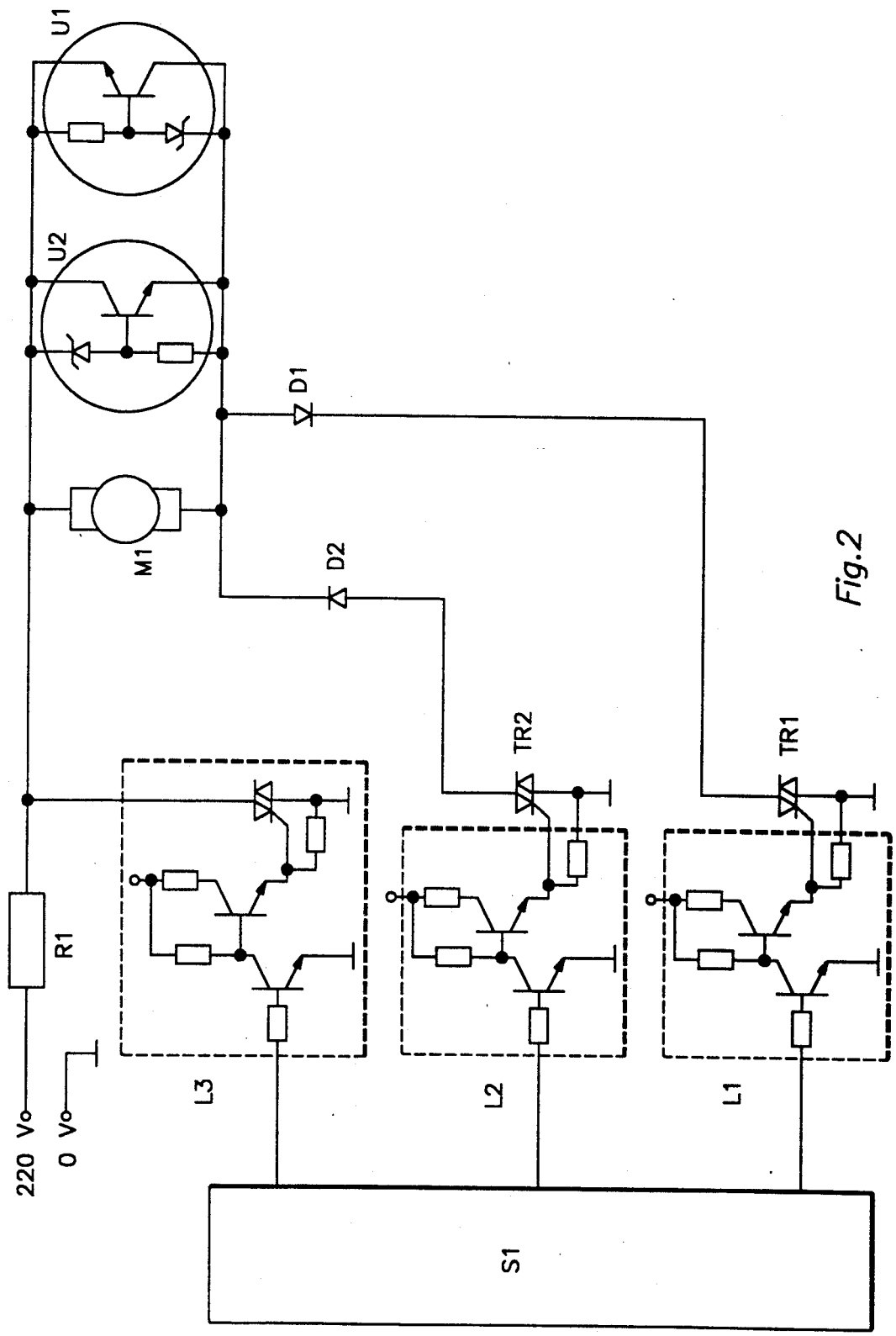
FIG. 2 shows a simplified electric schematic diagram used in an espresso machine according to the invention.

As can be further seen in FIG. 1, the hotplate 7 serves as a top cover of the housing 1 of the coffee brewing machine. The heating element 16 constituted by the drop resistor 6 has the shape of a wavy line and is thermally coupled to the hotplate 7. In this embodiment, the hotplate can be used to warm up the coffee cups 25 placed onto the hotplate 7. In order to warm up the coffee cups 25 as simply as possible to a desired temperature, the heating element 16 is automatically energized upon switching on the coffee machine. This can be effected by the control unit S1 (FIG. 2). Thereby, it may be expected that the coffee cups 25 placed on top of the hotplate 7 will have the desired temperature after a few minutes following the switching on of the coffee machine.

FIG. 2 shows a simplified schematic diagram of the electric control circuit of the coffee machine which is required for the operation of the electric DC motor M1 and the series connected drop resistor R1. There is provided a control unit S1 of conventional design, e.g. a microprocessor controlled device well known in the art which may be programmed for nearly every particular need. In the present example, the control unit S1 has three outputs. Connected to the first output is a driver circuit L1, to the second output a driver circuit L2 and to the third output a phase angle control circuit or a wave packet control circuit L3.

The output of the driver circuit L1 is connected to the gate of a triac TR1. The triac TR1 is connected in series to the cathode of a diode D1, while the anode of the diode D1 is connected to a first pole of the electric DC motor M1. The output of the driver circuit L2 is connected to the gate of a triac TR2. The triac TR2 is connected in series to the anode of a diode D2, while the cathode of the diode D1 is connected to the same first pole of the electric DC motor M1 as the anode of the diode D1. The output of the phase angle control circuit or the wave packet control circuit L3 is connected to the second pole of the electric DC motor M1. The drop resistor R1 simultaneously serving as the heating element 16 (FIG. 1) is also connected to the second pole of the electric DC motor M1. Finally, there are provided two overvoltage protective circuits U1 and U2. They are connected in parallel to the electric DC motor M1 in opposite orientations to protect the motor M1 from either positive or negative voltage peaks.

In operation of the electric DC motor M1, the mains voltage of e.g. 220 volts is lowered to the operating voltage of e.g. 48 volts by the series connected resistor R1. Thereby, the resistor dissipates a quite large amount of heat which is used to heat up the hot plate 7.

If the electric DC motor M1 has to be operated in a first sense of rotation in order to move the piston 5 (FIG. 1) downward into the brewing chamber 12, it is driven by actuating the driver circuit L1 which fires the triac TR1. The diode D1 is series connected with the triac TR1 and the electric DC motor M1. Due to the fact that the anode of the diode D1 is connected to the motor M1, the negative half-wave of the incoming AC voltage is suppressed by the Diode D1 such that only the positive half-waves of the mains voltage, lowered to the operating voltage of the motor M1 by the drop resistor R1, are used for driving the electric DC motor M1. This means that the electric DC motor is fed only with a constant polarity voltage (in this case with positive polarity), with the result that the electric DC motor M1 rotates in a first sense of rotation.

If the electric DC motor M1 has to be operated in a second sense of rotation in order to move the piston 5 (FIG. 1) upward out of the brewing chamber 12, it is driven by actuating the driver circuit L2 which fires the triac TR2. The diode D2 is series connected with the triac TR2 and the electric DC motor M1. Due to the fact that the cathode of the diode D2 is connected to the motor M1, the positive half-wave of the incoming AC voltage is suppressed by the Diode D2 such that only the negative half-waves of the mains voltage, lowered to the operating voltage of the motor M1 by the drop resistor R1, are used for driving the electric DC motor M1. This means that the electric DC motor is fed only with a constant polarity voltage (in this case with negative polarity), with the result that the electric DC motor M1 rotates in a second sense of rotation.

A smoothing of these half-waves is not necessary since the electric DC motor M1, together with the piston rod 9 and the piston 5 (FIG. 1), has quite a high moment of inertia; even if the electric DC motor M1 is operated with such a pulsating direct current, the resulting movement of the piston 5 will be smooth and continuous.

Voltage peaks which could be dangerous for the electric DC motor M1 are suppressed by the two overvoltage protective circuits U1 and U2 anti-parallelly connected to the two poles of the motor M1. Due to the anti-parallel connection, this is true both for the positive and the negative half-waves.

If only the coffee cups 25 are to be heated and the electric DC motor M1 has not to be put into operation, the drop resistor R1 serving to heat up the hotplate 7 can be energized by means of the phase angle control circuit or wave packet control circuit L3. For this purpose, an output signal is generated by the control unit S1 causing the triac in the phase angle control circuit or wave packet control circuit L3 to be intermittently fired. In this way, the power fed to the resistor R1 and, thereby, its heat dissipation can be regulated in a manner well known in the art.

As already mentioned, the control unit S1 contains a microprocessor. Thereby, it is possible that the control unit is prevented to produce nonsensical or inadmissible output signals. For example, the microprocessor makes sure that only one of the two driver circuits L1 and L2, respectively, is simultaneously activated to provide that the electric DC motor M1 is operated in only the first sense of rotation or in only the second sense of rotation. Further, the control unit must prevent that the phase angle control circuit or wave packet control circuit L3 can be activated when either the driver circuit L1 or the driver circuit L2 is in operation. Such a microprocessor controlled control unit S1 is well known in the art and must not be described here in detail.

Due to the fact that the electric DC motor M1 determines the stroke of the piston rod 9 directly, it is possible to control the electric DC motor M1 such that the coffee powder 10 contained in the brewing chamber 12 is always compressed to the same degree, independently from the amount of coffee powder 10 filled into the brewing chamber 12. This is in contrast to the electric AC motors used up to now; the AC motors can be operated only in one sense of rotation and this rotational motion must be transformed to a linear to-and-fro motion by means of a complicated linkage. In this case, the compression ratio of the coffee powder in the brewing chamber cannot be kept constant when the amount of coffee powder in the brewing chamber varies because the stroke of the piston is constructionally fixed and constant.

What is claimed is:

1. A coffee brewing machine, particularly an espresso coffee brewing machine, comprising:
    a container for fresh cold water;
    a boiler means for heating said fresh cold water;
    a brewing chamber adapted to receive coffee powder;
    a pump means for feeding said fresh cold water from said container to said boiler means and therefrom into said brewing chamber;
    a piston fitting into said brewing chamber and being movably mounted such that it can be moved into said brewing chamber to compress said coffee powder contained in said brewing chamber and removed from said brewing chamber;
    drive means for driving said piston into said brewing chamber and for retracting it out of said brewing chamber;
    said drive means comprising an electric DC motor adapted to be connected to a DC power supply having a nominal output voltage lower than the mains voltage;
    an electric resistor connected in series with said electric DC motor for the adaptation of the higher mains voltage to the operating voltage of said electric DC motor;
    first rectifier means and means for connecting said first rectifier means in series with said electric resistor and said electric DC motor for operating said motor in a first sense of rotation;
    second rectifier means and means for connecting said second rectifier means in series with said electric resistor and said electric DC motor for operating said motor in a second, opposite sense of rotation;

a hotplate for heating cups and for keeping the brewed coffee warm;

said electric resistor connected in series with said electric DC motor serving as a heating element for said hotplate.

2. A coffee brewing machine according to claim 1 in which said electric resistor can be operated as a heating element for said hotplate independently from the operation of said electric DC motor.

3. A coffee brewing machine according to claim 1 in which said electric resistor serving as a heating element for said hot plate has the shape of a wavy line.

4. A coffee brewing machine according to claim 1 in which said electric resistor is thermally coupled to said hotplate.

5. A coffee brewing machine according to claim 1 in which said hotplate serves for preheating coffee cups.

6. A coffee brewing machine according to claim 5 in which said hotplate constitutes the top cover of the coffee brewing machine housing.

7. A coffee brewing machine according to claim 1 in which said hotplate consists of metallic material.

8. A coffee brewing machine according to claim 2 in which means are provided which automatically energize said electric resistor serving as the heating element for said hotplate upon switching on the coffee brewing machine.

9. A coffee brewing machine according to claim 2 in which there is provided a phase angle control means or a wave packet control means for intermittently operating said hotplate by controlling the cycles of operation and thereby the heat power output of said hotplate.

* * * * *